April 20, 1965        S. M. TERRY ETAL        3,179,825
INDUCTOR ALTERNATOR HAVING A SALIENT POLE STATOR CONSTRUCTION
Filed Feb. 10, 1961                            2 Sheets-Sheet 1
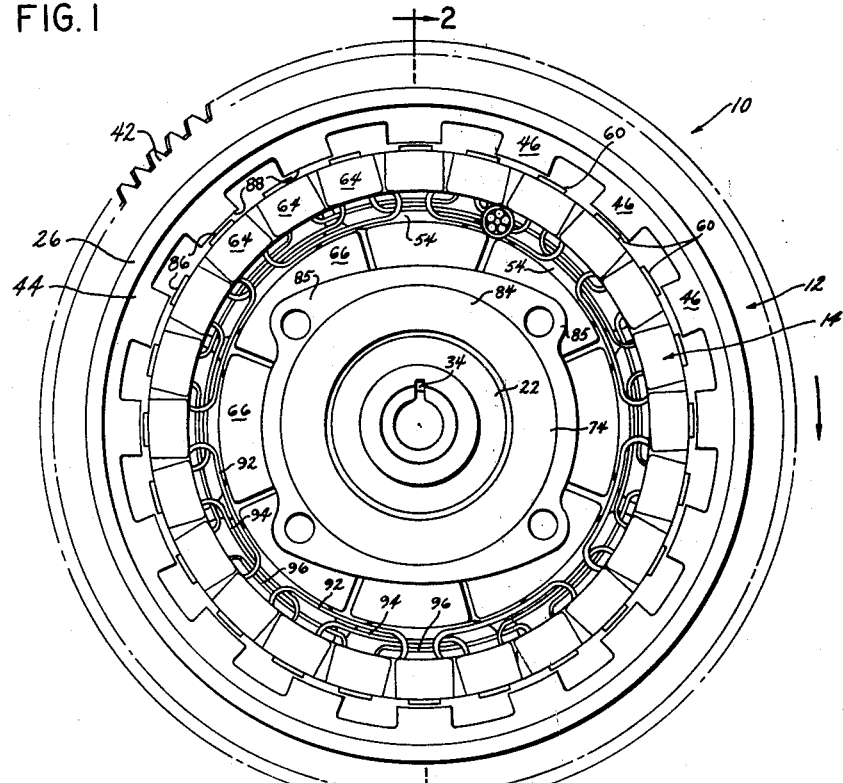
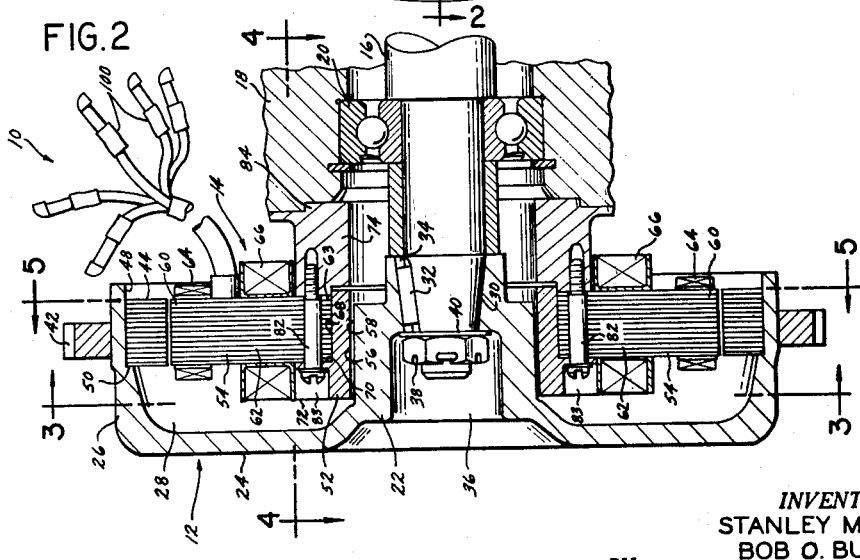
INVENTOR.
STANLEY M. TERRY
BOB O. BURSON
BY *Teller & McCormick*
ATTORNEYS April 20, 1965   S. M. TERRY ETAL   3,179,825
INDUCTOR ALTERNATOR HAVING A SALIENT POLE STATOR CONSTRUCTION
Filed Feb. 10, 1961   2 Sheets-Sheet 2
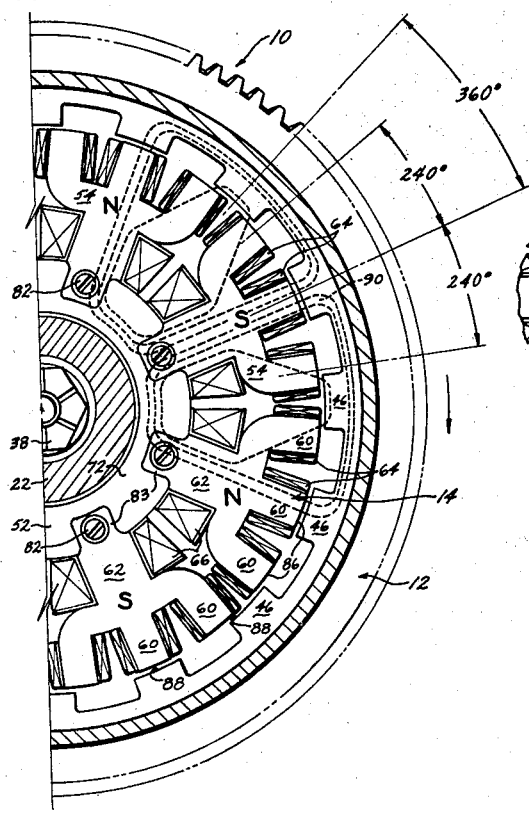
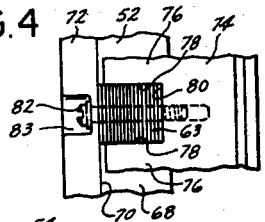
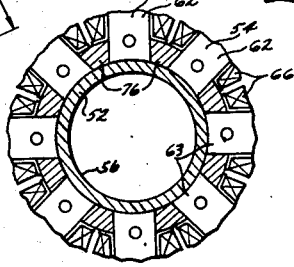
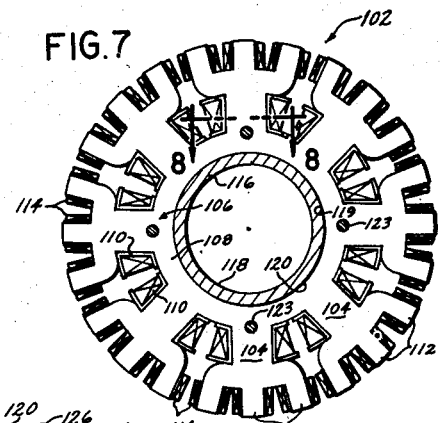
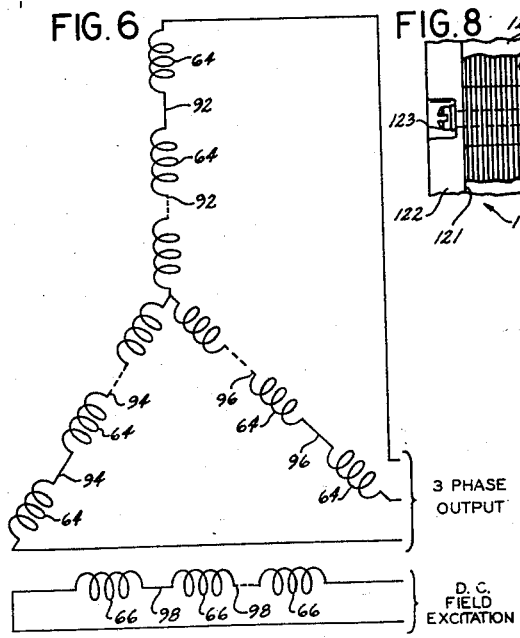
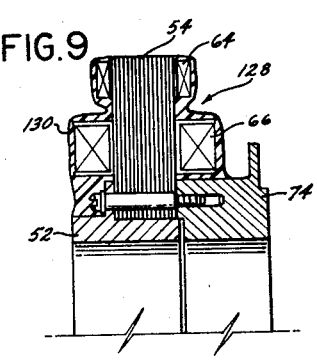

р

United States Patent Office 3,179,825
Patented Apr. 20, 1965

3,179,825
INDUCTOR ALTERNATOR HAVING A SALIENT POLE STATOR CONSTRUCTION
Stanley M. Terry and Bob O. Burson, Longmeadow, Mass., assignors, by mesne assignments, to R. E. Phelon Company, Inc., East Longmeadow, Mass., a corporation of Massachusetts
Filed Feb. 10, 1961, Ser. No. 88,531
6 Claims. (Cl. 310—67)

This invention relates to dynamo-electric machines, and deals more particularly with electric generators or alternators of the inductor type wherein the field and armature windings are fixed relative to one another and changes in flux necessary to provide an E.M.F. are produced by a rotating mass of magnetic material.

A general object of this invention is to provide an electric generating device particularly adapted for use as an auxiliary power unit for an internal combustion engine, and wherein part of the device serves as a flywheel for the engine.

Another object of the invention is to provide an electric generating device of the type mentioned in the last paragraph which device is of a simple construction making maximum utilization of the available space, which produces a three phase or other polyphase output at high efficiency, and which includes a wound field whereby the output voltage may be fully controlled by the simple expedient of regulating the field excitation.

Another object of this invention is to provide an electric generating device of three phase or other polyphase construction in which the stator and rotor teeth or poles and the field and armature coils are so arranged and proportioned that the flux in the main supporting magnetic portions of the machine is substantially constant at all speeds and loads, permitting the use of nonlaminated magnetic stator core and rotor materials and greatly contributing to quiet operation, high efficiency and simple low cost construction.

Another object of this invention is to provide an electric generating device having no moving contacts, such as slip rings or commutators, and which, if desired, may be easily and economically waterproofed to protect the same against the effects of water and other deleterious atmospheres.

A still further object of this invention is to provide an inductor alternator having a salient pole stator which stator may be constructed using separate pole structures whereby the field and armature coils may be wound separately from the stator and thereafter applied to the appropriate part or may be constructed using a one-piece stator core and pole member whereby all of the pole structures are integral with one another, the core and pole member being made of laminations, each of which laminations is a single stamping.

Another object of this invention is to provide an inductor alternator having a stator adapted to be connected directly to an engine block or other stationary engine structure and a flywheel rotor adapted for connection to a shaft of the engine, thereby simplifying the construction of the alternator and reducing the number of parts required.

Other objects and advantages of the invention will be apparent from the description and claims which follow and from the drawings forming a part of this specification.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:
FIG. 1 is an elevational view of an alternator embodying this invention, the view being taken looking toward the open end of the flywheel rotor.

FIG. 2 is a sectional view taken on the line 2—2 of FIG. 1, the view showing the alternator connected with an engine shaft and engine block or other stationary structure, which latter parts serve to support respectively the rotor and stator of the alternator.

FIG. 3 is a half sectional view taken on the line 3—3 of FIG. 2 with the armature and field coils being shown schematically.

FIG. 4 is a fragmentary sectional view taken on the line 4—4 of FIG. 1.

FIG. 5 is a fragmentary sectional view taken on the line 5—5 of FIG. 1 and drawn on a scale reduced from that of FIG. 1.

FIG. 6 is a schematic diagram illustrating the manner in which the various coils of the alternator are electrically connected.

FIG. 7 is a reduced scale view generally similar to FIG. 5, but showing an alternative stator construction employing a one-piece pole and core member.

FIG. 8 is a fragmentary sectional view taken on the line 8—8 of FIG. 7.

FIG. 9 is a half sectional view of a modified form of stator which may be employed in the alternator of FIG. 1.

In the drawings, wherein is shown the presently preferred embodiments of this invention, and first referring to FIGS. 1, 2 and 3, the reference numeral 10 indicates in general a complete inductor alternator made in accordance with this invention. The alternator 10 basically comprises a rotor 12 which is in the form of a flywheel and adapted for attachment to an engine shaft or the like and a stator 14 which is adapted for attachment to the stationary structure of the engine in concentric relation to the rotor carrying shaft. As an example of how the alternator may be mounted to an engine, FIG. 2 shows the rotor 12 attached to a shaft 16 and the stator 14 attached to a stationary structure 18. The stationary structure may be part of the engine block and the shaft 16 a shaft driven from the crankshaft of the engine and supported for rotation relative to the stationary structure 18 by means of a ball bearing unit 20, as shown. Rotation of the shaft 16 accordingly causes rotation of the rotor 12 relative to the stator 14.

Associated with the stator is a means for establishing a magnetic field passing through the various parts of the alternator and a number of armature coils arranged to have electrical currents induced therein as a result of changes in the magnetic flux linked therewith. These changes in the magnetic flux, necessary to induce the currents in the armature coils, are in turn produced by means of teeth or poles on the rotor which cooperate with teeth or poles on the stator to vary the reluctance of the flux paths through the armature coils. The construction and arrangement of the cooperating rotor and stator parts and the electrical interconnection of the various armature coils in such that a three phase or other polyphase output is provided. This output may in turn be used directly as a power source for various auxiliary equipment associated with the engine or may be rectified for battery charging purposes and the like.

As mentioned, the rotor 12 is in the form of a flywheel. Referring to FIG. 2, it will be observed that the illustrated rotor includes a generally axially extending hub 22, a radially extending web 24 and a rim 26 which extends axially of the web 24 in the same direction as the hub 22. The hub, web and rim therefore define an annular recess 28 which receives the stator 14. Preferably, and as shown, the hub, web and rim comprise a single integral unit which may be made by a casting process. The unit does not form part of the flux path and therefore can be made of a nonmagnetic material to minimize the leakage of flux to the shaft 16 or other engine parts.

Although various different means for attaching the rotor 12 to the shaft 16 may be employed without departing from the invention, the hub 22 of the illustrated rotor is provided with a tapered bore 30 at its right-hand end, as viewed in FIG. 2, which bore receives a correspondingly tapered portion of the shaft 16. The hub is angularly fixed to the shaft by a key 32 which fits in a key slot 34 of the hub and a corresponding slot in the shaft, as shown in FIG. 2. To the left of the tapered bore 30 the hub 22 is provided with an enlarged bore 36 which receives the threaded end of the shaft 16 and a nut 38 and washer 40 for axially fixing the rotor to the shaft, as shown. Also, as shown in FIGS. 1, 2 and 3, the rim 26 of the rotor has fixed thereto, as by press fitting, an annular gear 42 which surrounds the rotor and serves, for example, to mesh with the pinion of a starter motor or other device. The gear 42, however, is not essential to this invention and may be omitted if desired. At this point, it should also be noted that the rotor 12, due to the arrangement of its parts, has a relatively high moment of inertia about the axis of the shaft 16 so that apart from its flux-varying function in connection with the stator 14 it will also have a flywheel effect on the shaft 16 and may therefore be used to replace the flywheel conventionally used with the engine. It will also be noted that the construction of the rotor and stator is such that they both occupy a relatively small amount of space. In fact their size is such that they take up little more, if any, space than taken up by a conventional flywheel.

For the purpose of producing a variation in the reluctance of the flux paths linking the armature coils of the stator, the rotor rim 26 has connected therewith an annulus 44 comprised of a plurality of laminations of magnetic material. The laminated construction, while preferred, is not however essential to the invention and the annulus could be made as a solid unit. The annulus is angularly fixed to the rim 26, as by press fitting, and includes a plurality of angularly spaced poles or teeth 46, 46 arranged in circular alignment and extending inwardly from the body thereof. To receive the annulus 44, the inner surface of the rim 26 is machined to provide a cylindrical surface 48 which terminates inwardly of the rim in a shoulder 50. In assembling the annulus with the rim, the annulus is pressed into the rim until the inner or left-hand face of the annulus engages the shoulder 50, as shown in FIG. 2.

The structure of the stator 14 is best shown in FIGS. 2 to 5. Referring to FIGS. 2 and 3, it will be observed that the stator includes an inner annular member 52 and a plurality of salient pole structures 54, 54 arranged circumaxially about the inner member 52 and extending generally radially outwardly therefrom. The inner member 52 and all of the pole structures 54, 54 are made of magnetic material and constitute parts of low reluctance flux paths for the magnetic fields established in the alternator. The inner member 52 is preferably of a solid construction and is provided with a cylindrical bore 56 which receives a portion of the rotor hub 22 having a corresponding outer cylindrical surface 58 arranged concentrically therewith.

The pole structures 54, 54 are preferably of laminated construction, as shown in FIG. 2, and, as shown in FIGS. 2 and 3, each includes a circumferentially enlarged radially outer portion defining a plurality of spaced poles or teeth 60, 60, a core portion 62, and an inner end portion 63 which is essentially a continuation of the core portion and which is used for connecting the pole structures to the inner member 52. The number of teeth 60, 60 on each pole structure may be varied, but according to the preferred arrangement is dependent on and equal to the desired number of phases in the output voltage or current. For instance, in the case of the illustrated alternator it is assumed that a three phase output voltage and current are desired and therefore each of its pole structures is provided with three teeth 60, 60. The reason for this will be explained more fully below. At this time it should be noted however that the three teeth 60, 60 of each pole structure are each provided with an armature coil 64 which coil surrounds the associated tooth so as to have a voltage or E.M.F. induced therein as a result of flux variations in the tooth, and that the core portion 62 of each pole structure receives a field coil 66 which surrounds the core portion and is adapted to set up a magnetic flux in the pole structure when excited by D.C. current. Each of the field coils has a central opening that conforms closely to the outer surface of the associated core portion so that the coil fits relatively snugly on the core portion.

To simplify the assembly of the stator, the core portions of the pole structures can be of such a shape that the field coils may be prewound separate from the pole structures and then applied to the core portions prior to the assembly of the pole structures with the inner annular member. This means that the radially inner end portions 63, 63 of the pole structures should have a cross-sectional shape no larger than that of the smallest section of the opening in the field coils so that the coils may be passed over the end portions during assembly. For example, in the illustrated case the core portions and the inner end portions are of substantially the same uniform square cross section along their lengths, and the field coils have central openings conforming to such cross sections. Depending on the means for fastening the pole structures to the inner member, however, the inner end portions could be shaped differently than shown and could be made of smaller cross section than the core portions.

The pole structures 54, 54 may be held or fixed to the inner annular member 52 by various suitable means. In the illustrated case the inner member 52 has a cylindrical outer surface 68 which extends, as viewed in FIG. 2, from the right-hand end of the member to a radial shoulder or abutment 70. To the left of the shoulder 70 is a radially enlarged, generally cylindrical portion 72. Cooperating with the inner member 52 is a mounting ring 74 which serves both as a means for connecting the stator to the stationary engine structure 18 and as part of the means for fixing the pole structures relative to the member 52. For the latter purpose the left-hand portion of the mounting ring, as viewed in FIGS. 2 and 4, is provided with a plurality of angularly spaced fingers 76, 76 which fit between the inner end portions 63, 63 of the pole structures and have axially extending radial surfaces 78, 78 which engage the sides of the inner end portions 63, 63 to support or hold the same in the desired angularly spaced positions. Between each pair of the radial surfaces 78, 78 is a flat end surface or abutment 80 which engages the forward or right-hand face of the associated inner end portion 63, the surfaces 78, 78 and the surface 80 in effect defining a notch for receiving the end portion. The end portions 63, 63 are in turn held in the notches so defined by a plurality of threaded fasteners 82, 82 which extend through openings in the enlarged portion 72 of the inner member, through the end portions and into threaded engagement with the ring member 74, there being one fastener for each inner end portion.

The heads of the fasteners 82, 82 are located in recesses 83, 83 in the left-hand end of the member 52 and each fastener includes a smooth cylindrical shank portion which fits relatively closely the opening in the associated end portion 63. The fasteners therefore prevent the end portions from moving radially with respect to the inner member, and the openings in the end portions are so located that the fasteners hold the inner ends of the end portions in engagement with the surface 68 of the inner member, as shown in FIGS. 2 and 5. It will be observed that the fasteners 82, 82 also serve when tightened to draw the mounting ring toward the inner member so that the end portions are clamped between the shoulder 70 of the inner member and the surfaces 80, 80 of the mounting ring and are thereby restrained against relative axial movement.

At its right-hand end the mounting ring 74 is machined to provide an annular ring 84 which fits within a corresponding annular recess of the stationary engine structure 18 to locate the mounting ring and stator 14 in concentric relationship with the axis of the shaft 16. The mounting ring is adapted to be fixed to the engine structure 18 by a plurality of apertured ears 85, 85 which extend outwardly from the body thereof to receive bolts or other devices for fastening the same to the engine structure. Preferably the mounting ring 74 is made from a nonmagnetic material, such as aluminum, to prevent the leakage of magnetic flux to the engine structure, in which case the inner member 52 serves to provide a low reluctance path for the flow of flux between the inner ends of adjacent core portions 62, 62.

As shown best in FIGS. 1 and 3, the circumferential length of the outer portions of the pole structures and the arrangement of the teeth thereon is such that the pole structures collectively provide an annular series of teeth equally angularly spaced along the full circumference of the stator with their outer end faces 86, 86 being in close radially spaced relationship to the inner end faces 88, 88 of the rotor poles 46, 46 when the rotor poles are brought into angular alignment therewith by rotation of the rotor. Thus, when a rotor pole is aligned with a corresponding stator tooth, a relatively thin air gap will exist therebetween. As shown, the rotor pole end faces 88, 88 are of slightly larger circumferential length than the stator teeth end faces 86, 86. This is found to result in more nearly sinusoidally varying voltages in the armature coils 64, 64, but if desired the end faces 86, 86 could be made the same length as the end faces 88, 88 or of another relative size different from that shown without departing from the invention.

Assuming, as is the case, that magnetic flux flows between the stator and the annulus 44, it will be obvious from FIG. 3 that as the rotor rotates, the teeth 60, 60 of the stator will be alternately brought into and out of alignment with the rotor poles 46, 46. When a particular stator tooth 60 is fully angularly aligned with one of the stator poles 46, 46, the flux path through that tooth will have a minimum reluctance and the total flux passing therethrough will be at a maximum value. Similarly, when the stator tooth is located midway between two adjacent rotor poles the reluctance of the flux path through the tooth will be relatively high and the total flux through the tooth will be at a minimum value approaching zero. Between these two positions of the stator tooth relative to the rotor poles the reluctance of the flux path and the total flux passing through the tooth will be at intermediate values.

The field coils 66, 66 serve as the source of magnetic flux for the alternator. They are adapted for excitation by a D.C. source of power and alternate ones are wound in opposite directions so that when the coils are energized the three teeth of any one pole structure will be magnetically charged in a sense opposite to the teeth of the immediately adjacent pole structures. This is illustrated, for example, in FIG. 3 where the letter N is applied to teeth charged magnetically north and the letter S is applied to teeth charged magnetically south. The coils 66, 66 are provided with central openings which receive the corresponding core portions of the pole structures and are of such radial dimensions as to fit conveniently and without looseness between the outer tooth-forming arms of the pole structures and the outer surfaces of the inner member 52 and the mounting ring 74. In the present case each of the coils 66, 66 is shown to be a single coil and as indicated hereinafter is connected in series with the other coils. The coils may be wound for separate excitation by an external source other than the alternator, or may be wound for either series or parallel connection with the load for self-excitation by the output of the alternator after rectification. Although not shown, it is also contemplated that each coil 66 could be wound as two separate parts or coils with the corresponding coil parts of each pole structure being connected in series to provide for compound excitation with one group of coil parts being connected in series with the load and the other group being connected in parallel with the load.

The flux pattern set up by the pole structures is indicated generally by the broken lines 90 in FIG. 3. The total flux passing through any one of the core portions 62, 62 remains substantially constant and is divided between the three teeth associated therewith in accordance with their degree of overlap with corresponding rotor poles. That is, the sum of the reluctances of the flux path through the three teeth of each pole structure remains substantially constant even though the reluctance of each individual path varies. When the rotor and stator are in the relative arrangement shown in FIG. 3, the greatest amount of flux passes through the middle tooth of each pole structure while lesser amounts flow through the end teeth. The flux which leaves the teeth of one pole structure enters the annulus 44, and by passing through the annulus poles and the radially outer or circumferential core portion of the annulus, returns through the oppositely charged teeth of the immediately adjacent poles. At the other ends of the pole structures the flux passes between the oppositely charged ends of the core portions 62, 62 by passing through a portion of the inner stator member 52. It should be noted that the flux variations are confined in general to the stator teeth 60, 60 and that in the core portions 62, 62 and in the inner member 52 the flux is substantially constant. Therefore, hysteresis and eddy current losses are substantially eliminated in the solid inner member and substantially no induced voltages are set up in the field coils.

As mentioned previously, the alternator 10 is designed to provide a three phase output. Although various different arrangements of the stator teeth and rotor poles might be employed to produce such an output, the preferred arrangement is shown in FIG. 1. From this figure, it will be noted that the rotor poles 46, 46 are equally angularly spaced circumaxially of the rotor rim and that the stator teeth 60, 60 are also equally angularly spaced, but by a smaller amount. Assuming the angular spacing between adjacent rotor poles 46, 46 to be equal to 360 electrical degrees, as shown in FIG. 1, the angular spacing between adjacent stator teeth 60, 60 is such as to equal 240 electrical degrees. Also, the spacing between adjacent pole structures, measured from center line to center line, is equal to twice the spacing between adjacent rotor poles, or 720 electrical degrees. Accordingly, when the stator and rotor are in the relative positions shown in FIG. 3, the middle tooth 60 of each pole structure will be fully aligned with a corresponding rotor pole 46, and the other two teeth of each pole structure will be respectively plus and minus 240 degrees from alignment with the same rotor pole. For convenience, the group of stator teeth comprised of and including the first tooth on each pole structure, counting clockwise, will be referred to as a first group of teeth, the group comprised of and including the middle tooth of each pole structure will be referred to as a second group of teeth, and the group comprised of and including the third tooth on each pole structure will be referred to as a third group of teeth. Therefore, assuming that the rotor 12 is rotated clockwise, as shown by the arrow in FIGS. 1 and 3, the teeth of the second group will be at a maximum alignment with corresponding rotor poles at the instant pictured, the teeth of the first group will be displaced by 120 electrical degrees from, and will be approaching, full alignment with other rotor poles, and the teeth of the third group will be displaced by 120 electrical degrees and will be departing from full alignment with the same rotor poles as approached by the first group of stator teeth. Each time the rotor is moved a distance equal to 360 electrical degrees, or the distance between two adjacent rotor poles, each of the teeth will pass through one full cycle of reluctance variation and as the rotation of the rotor continues the variation will be periodically repeated.

With conditions as shown in FIG. 3 the reluctance of the flux paths through the stator teeth of the second group will be at a minimum value, the reluctance of the flux path through the stator teeth comprising the first group will be at an intermediate value and will be decreasing, and the reluctance of the flux paths through the teeth comprising the third group will be at an intermediate value and will be increasing. Consequently, the flux through each tooth and associated armature coil of the second group will be at its maximum value, the flux through the teeth and associated coils of the first group will be increasing and the flux through the teeth and associated coils of the third group will be decreasing. Assuming that the rotation of the rotor causes the flux in each stator tooth to vary sinusoidally, as is approximately the case, the voltages or E.M.F.'s induced in the armature coils will also vary sinusoidally, with the voltages induced in each coil being 90 degrees out of phase and leading the associated flux. Furthermore, the phase relationship between the voltages generated in the three groups of coils associated with the three groups of stator teeth is such that the voltages induced in the coils of the first group of stator teeth will lag by 120 degrees the voltages induced in the coils of the second group of teeth, and the voltages induced in the coils of the third group of teeth will lead by 120 degrees the voltages induced in the coils of the second group.

As shown in FIG. 1, the coils associated with each group of stator teeth are preferably electrically interconnected in series, the coils of the first group being interconnected by leads 92, 92, the coils of the second group being interconnected by leads 94, 94 and the coils of the third group being interconnected by leads 96, 96. Also it should be noted that the armature coils 64, 64 on the teeth of alternate pole structures are wound in opposite directions so that all of the coils associated with north charged stator teeth are wound in one direction, and all of the coils associated with south charged stator teeth are wound in the opposite direction. By doing this the voltages induced in all of the coils of any one of the three groups of teeth will be in phase with each other. FIG. 6 shows schematically the electrical interconnection of the coils from which it will be noted that the three groups of series connected coils are connected in the familiar three phase Y arrangement. Instead of the Y connection, the three groups of series connected coils could also, if desired, be connected in Δ fashion. It will also be noted that the field coils 66, 66 are also connected in series by suitable leads 98, 98. The output voltage will be dependent on the strength of the flux field produced by the field coils and therefore the output voltage may be readily varied by varying the voltage supplied to the field coils. The three phase output is taken from the alternator, and the D.C. field excitation supplied to the field coils by the leads indicated at 100, 100 in FIGS. 1 and 2.

Instead of a stator having separate pole structures 54, 54, the alternator may employ an alternate form of stator wherein the pole structures are part of a one-piece core and pole member whereby all of the pole structures are integral with one another, the core and pole member being made of identical annular laminations each of which is a single stamping. Such an alternative form of stator is shown at 102 in FIGS. 7 and 8. This stator is generally similar to the stator 14 of FIGS. 1 to 5 and includes pole structures 104, 104 which are generally similar to the pole structures 56, 56 of the stator 14. The pole structures 104, 104, however, instead of being separate from one another and individually connected to an inner annular stator member are part of a one-piece laminated core and pole member 106 comprising the pole structures 104, 104 and an annular core 108 integral with the pole structures. The laminations from which the core and pole member is made are each shaped to contain all of the pole structures 104, 104 and the core member 108 so as to be capable of being cut from flat stock by a single stamping operation.

The one-piece construction of the core and pole member simplifies the assembly of the pole structures to the stator, but means that the field coils must be wound directly in place on the pole structure core portions. These field coils are shown schematically at 110 in FIG. 7 and are similar to the field coils 66, 66 of the stator 14. The pole structures 104, 104 of the stator 102 also have teeth 112, 112 shaped and spaced similarly to the teeth 60, 60 of the pole structures 56, 56 and provided with armature coils 114, 114 similar to the armature coils 64, 64.

As shown in FIGS. 7 and 8, the core and pole member 106 has associated therewith an inner annular stator member 116. The member 116 is substantially similar to the member 52 of the stator 14 and has a cylindrical bore 118 designed to receive the hub 22 of the rotor and to provide a thin airgap between the surface of the bore and the outer cylindrical surface 58 of the hub. A cylindrical outer surface 120 on the member 116 receives the core and pole member 106 and fits closely with the inner surface 119 of the latter member. At its left-hand face, as viewed in FIG. 8, the core and pole member engages a shoulder or abutment 121 formed by a radially enlarged portion 122 of the member 116. A plurality of threaded fasteners 123, 123 pass through the aforesaid enlarged portion and the core and pole member and are threadably received by a mounting ring 124 to hold the pole and core member in place on the member 116. The mounting ring 124 is substantially similar to the corresponding ring 74 of the stator 14 except that in place of the spaced fingers 76, 76 it has a continuous annular surface or abutment 126 at its left-hand end which flatly engages the right-hand face of the core and pole member. The core and pole member 106 is therefore clamped between the abutments 121 and 126.

Although not shown, it is also contemplated that in the case of a stator having a one-piece core and pole member the inner annular stator member, such as that shown at 116 in FIGS. 7 and 8, could be omitted and the core and pole member fastened directly to the mounting ring by suitable means such as threaded fasteners similar to the fasteners 123, 123. In this case the core portion 108 of the core and pole member would be extended further radially inwardly from that shown in FIGS. 7 and 8 so that the inner surface 119 thereof would be closely spaced with relation to the cylindrical surface 58 of the rotor hub to provide a thin airgap between the hub and the core and pole member.

One of the features of this invention is that the above described structure of the alternator may be readily and economically waterproofed to protect the same from water and other atmospheres. FIG. 9 shows a waterproofed stator 128 which may be employed in the alternator 10 in place of the stator shown in FIGS. 1, 2 and 3. The stator 128 is identical with the stator 14 described above except for the addition of a potting or waterproofing material which surrounds the field coils 66, 66, the armature coils 64, 64 and at least part of the other structure of the stator so as to completely seal the field and armature coils from the surrounding atmosphere. In FIG. 9 the potting material is indicated at 130. This material is preferably an epoxy or other suitable material conventionally used for potting purposes. The material may be applied to the stator by the use of a mold, in which case the potting material is cast around the various parts of the stator, or may be applied by dipping the stator into a quantity of the material. After the casting or dipping process, any material which adheres to the end faces 86, 86 of the teeth 60, 60 should be removed to avoid interference with the rotor poles 46, 46. Likewise, any potting material adhering to the bore 56 should be removed to avoid interference with the rotor hub 22. Since the alternator contains no moving contacts, the potting material surrounds all of the current carrying elements and provides a more effective degree of waterproofing than is generally obtainable with other electrical generating devices. The rotor 12 might also be provided with a coat of potting material to prevent rust; however, since the rotor contains no current carrying elements, this is not necessary for the complete and effective waterproofing of the device. The potting material 130 may also be applied to the stator 102 shown in FIGS. 7 and 8, or to any other stator embodying this invention, in the manner shown and described in connection with FIG. 9 to provide a completely waterproofed machine.

The invention claimed is:

1. In a stator for an inductor alternator, the combination comprising:
   an inner annular member made of a magnetic material and having a first axial portion of one diameter and a second axial portion of an enlarged diameter separated from said first portion by a radial shoulder,
   a plurality of salient pole structures arranged in circumaxially spaced relation about said first axial portion of said inner member and extending generally radially outwardly therefrom,
   said pole structures being individual units separate from each other and separate from said inner annular member and each including an enlarged radially outer portion, a radially inner end portion, and a core portion between said outer and inner portions, said inner end portions of said pole structures being angularly spaced from each other and located adjacent said radial shoulder,
   a plurality of field coils each of which is received by and surrounds the core portion of a respective one of said pole structures and each of which has a central opening that conforms relatively closely to the outer surface of the associated core portion,
   said inner end portions of said pole structures having such a cross-sectional shape as to be capable of passing through said openings in said field coils so that said field coils may be prewound separately from said pole structures and applied to said core portions by being moved over said inner end portions prior to the assembly of said pole structures with said inner member, and
   means associated with said inner end portions for fixing said pole structures relative to said inner annular member in such a manner that said inner member engages said inner end portions and provides a low reluctance path for the flow of magnetic flux between said pole structures, said latter means including a ring member having a plurality of axially extending fingers which fit into the spaces between said inner end portions of said pole structure, said ring member also having abutment surfaces between said fingers and between which abutment surfaces and said radial shoulder said inner end portions of said pole structures are located.

2. The combination defined in claim 1 further characterized by said means for fixing said inner end portions of said pole structures relative to said inner annular member further including a plurality of fasteners each passing axially through a respective one of said inner end portions and at least partially through said enlarged portion of said inner annular member and said ring member for holding said pole structures against radial movement and for holding said ring member to said annular member so as to clamp said inner end portions of said pole structures between said radial shoulder and said abutment surfaces of said ring member.

3. The combination defined in claim 1 further characterized by said ring member being made of a nonmagnetic material and including means adapting the same for connection to a supporting structure.

4. The combination defined in claim 1 further characterized by each of said core portions of said pole structures being of substantially uniform cross-sectional shape along its length and each of said inner end portions of said pole structures being of substantially the same cross-sectional shape as the associated core portion.

5. In an inductor alternator for producing a three phase output, the combination of:
   a rotor having an annulus of magnetic material provided with an annular series of radially inwardly extending poles adjacent ones of which are spaced apart by 360 electrical degrees, and
   a stator including an annular inner member of magnetic material,
   a plurality of separate salient pole structures arranged in circumaxial relation about said inner member and extending generally radially outwardly therefrom with adjacent ones of said pole structures being spaced apart by 720 electrical degrees,
   said pole structures each including a circumferentially enlarged radially outer portion defining three teeth spaced apart circumaxially by 240 electrical degrees and a core portion located inwardly of said enlarged portion and each of said pole structures being in engagement at its inner end with said inner member to provide a low reluctance flux path between said pole structures,
   a plurality of field coils each received by and surrounding a respective one of said core portions,
   a plurality of armature coils each received by and surrounding a respective one of said stator teeth, and
   means connecting in series the armature coils associated with corresponding teeth on said pole structures.

6. In an inductor alternator, the combination of:
   a stator including a plurality of salient pole structures arranged in circumaxially spaced relation and each of which pole structures includes a plurality of radially extending stator teeth which collectively define an annular series of circumaxially extending and circumaxially spaced end faces, which end faces have a circumaxial length substantially equal to the circumaxial length of the spaces separating adjacent end faces,
   a rotor adapted for rotation relative to said stator and including a plurality of radially extending rotor poles which define an annular series of circumaxially extending and circumaxially spaced end faces which end faces are moved into and out of angular alignment with said stator teeth end faces as said rotor is rotated relative to said stator, said rotor pole end faces having a circumaxial length substantially equal to the circumaxial length of the spaces separating adjacent rotor pole end faces and there being two of said rotor pole end faces for every three stator teeth,
   said rotor pole end faces being circumaxially separated by spaces substantially longer than the circumaxial length of said stator teeth end faces so that when a stator tooth end face is located centrally between two adjacent rotor pole end faces it is spaced a substantial circumaxial distance from said latter end faces,
   a plurality of armature coils each of which is received by and surrounds a respective one of said stator teeth, and
   a plurality of field coils each of which is received by and surrounds a respective one of said salient pole structures, said rotor poles being spaced apart by 360 electrical degrees, said stator teeth being spaced apart by 240 electrical degrees, and said salient poles being spaced apart by 720 electrical degrees with there being three stator teeth on each salient pole.

References Cited by the Examiner

UNITED STATES PATENTS

| | | | |
|---|---|---|---|
| 559,419 | 5/96 | Steinmetz | 310—168 |
| 1,366,562 | 1/21 | Engel | 315—218 |
| 1,687,233 | 10/28 | Stoller | 310—169 |
| 2,071,953 | 2/37 | Schou | 310—168 |
| 2,430,163 | 11/47 | Dever | 310—67 |
| 2,618,757 | 11/52 | Weiseman | 310—45 X |
| 2,744,204 | 5/56 | McGuiness | 310—218 |
| 2,814,745 | 11/57 | Sinclair | 310—168 |
| 2,945,141 | 7/60 | Van De Graaff et al. | 310—168 |

FOREIGN PATENTS 119,234  9/59  Russia.

ORIS L. RADER, *Primary Examiner.*
MILTON O. HIRSHFIELD, *Examiner.*